(12) United States Patent
Filiatrault et al.

(10) Patent No.: US 7,652,095 B2
(45) Date of Patent: Jan. 26, 2010

(54) PRESSURE-SENSITIVE ADHESIVE CONTAINING AZIRIDINYL SILANES

(75) Inventors: Timothy D. Filiatrault, Maplewood, MN (US); Maureen A. Kavanagh, Stanchfield, MN (US); Kelly S. Anderson, Houlton, WI (US); Kevin M. Lewandowski, Inver Grove Heights, MN (US); Larry R. Krepski, White Bear Lake, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 309 days.

(21) Appl. No.: 11/765,963

(22) Filed: Jun. 20, 2007

(65) Prior Publication Data
US 2008/0319122 A1 Dec. 25, 2008

(51) Int. Cl.
*C08K 3/36* (2006.01)
*C08G 63/00* (2006.01)

(52) U.S. Cl. .......... 524/493; 548/955; 524/606

(58) Field of Classification Search .......... 524/493, 524/606; 548/955
See application file for complete search history.

(56) References Cited

U.S. PATENT DOCUMENTS

| | | | |
|---|---|---|---|
| RE24,906 E | 12/1960 | Ulrich | |
| 3,243,429 A | 3/1966 | Ham | |
| 3,691,140 A | 9/1972 | Silver | |
| 3,711,466 A * | 1/1973 | Uelzmann et al. | ........... 548/955 |
| 3,925,442 A | 12/1975 | Samour | |
| 3,983,166 A | 9/1976 | Samour | |
| 4,026,880 A | 5/1977 | Mitchell | |
| 4,166,152 A | 8/1979 | Baker et al. | |
| 4,636,432 A | 1/1987 | Shibano et al. | |
| 4,656,218 A | 4/1987 | Kinoshita | |
| 5,045,569 A | 9/1991 | Delgado | |
| 5,221,497 A | 6/1993 | Watanabe et al. | |
| 5,597,512 A | 1/1997 | Watanabe et al. | |
| 2006/0162857 A1 | 7/2006 | Nagamoto et al. | |
| 2007/0213448 A1 | 9/2007 | Lewandowski et al. | |

FOREIGN PATENT DOCUMENTS

| | | |
|---|---|---|
| EP | 1 437 394 A1 | 7/2004 |
| WO | WO 89/12618 A1 | 12/1989 |

OTHER PUBLICATIONS

Perchenko et al., "Synthesis of Organosilicon Compounds Containing the Ethylenimine Three-Membered Hetero Ring in a Hydrocarbon Radical", Doklady Akademii Nauk SSSR (Eng. Translation), (1964), pp. 898-901, vol. 158, No. 2.
Blackley, "Emulsion Polymerisation Theory and Practice", (1975), John Wiley & Sons, Inc., New York.
ASTM D 3330-76, "Standard Test Methods for Peel Adhesion of Pressure-Sensitive Tape at 180-Deg Angle", pp. 661-664.
ANSI/ASTM D 3654-78, "Standard Test Method for Holding Power of Pressure-Sensitive Tapes", pp. 725-727.
PCT Search Report, PCT/US2008/064980, filed May 28, 2008.

* cited by examiner

*Primary Examiner*—Robert D. Harlan
(74) *Attorney, Agent, or Firm*—Kent S. Kokko

(57) ABSTRACT

An adhesive composition comprising an emulsion polymer which comprises a (meth)acrylate copolymer, and aziridinyl silane and an optional silica particle component is described. The addition of the aziridinyl silane results in a significant increase in the shear properties, particularly at elevated temperatures.

25 Claims, No Drawings

PRESSURE-SENSITIVE ADHESIVE CONTAINING AZIRIDINYL SILANES

BACKGROUND OF THE INVENTION

Pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

U.S. Pat. No. Re. 24,906 (Ulrich) discloses a pressure-sensitive adhesive tape, the adhesive layer of which comprises a copolymer of acrylic acid ester and a copolymerizable monomer such as acrylic acid, described therein as an "acrylic pressure-sensitive adhesive tape". Although acrylic pressure-sensitive adhesive tape may provide acceptable strength and good adhesion, there has been a need for even higher shear strength, especially at elevated temperatures, without any reduction in adhesion, particularly in peel strength.

SUMMARY

The present invention is directed to a composite adhesive composition comprising the reaction product of a (meth)acrylate copolymer, aziridinyl silane coupling agent and optionally a silica particle component. The silica particle component may be acicular (needle-like) having a high aspect ratio, or may be substantially spherical, having an average particle diameter of 20 nanometers or less. In another embodiment the invention provides a composite adhesive composition comprising the reaction product of a (meth)acrylate copolymer, aziridinyl silane coupling agent and a silica particle component.

In another embodiment, the present invention provides an aqueous emulsion of the reaction product of the (meth)acrylate copolymer, aziridinyl silane coupling agent and optionally a silica particle component, that may be coated and dried to produce a pressure-sensitive adhesive article. In some embodiments, the addition of the silica particle component results in a significant increase in the overlap shear properties of the adhesive. In some embodiments, only a small amount of aziridinyl silane (0.005 to 0.5 parts by weight percent, relative to the 100 parts by weight of the adhesive (meth)acrylate copolymer) is needed to observe the increase in shear properties with the acrylic pressure-sensitive adhesives described herein.

For environmental reasons, there is a desire to move away from the use of volatile organic solvents (VOC's) in coating processes, and towards more environmentally friendly water-based materials, so the present invention provides a water-borne adhesive comprising an aqueous emulsion of the (meth)acrylate copolymer, the aziridinyl silane, and optionally a silica particle component composite. Waterborne systems are desirable for cost, environmental, safety, and regulatory reasons. The aqueous system may be readily coated, and provides a pressure-sensitive adhesive when dried. As used herein:

"composite" refers to a mixture comprising substantially silica nanoparticles dispersed in, and chemically bonded to, the described (meth)acrylate copolymer.

"emulsion" refers to a stable mixture of two or more immiscible liquids held in suspension by one or more surfactants, more specifically it refers to a stable mixture of the instant polymerizable monomer mixture, or resultant polymer, and water;

"latex" refers to an aqueous suspension or emulsion of a polymer, more specifically it refers to an aqueous emulsion of the instant polymer;

"oil-in-water emulsion" refers to a mixture in which the water forms a continuous phase and the monomers (oil) is in discontinuous droplets;

"oil phase" in an oil-in-water emulsion refers to all components in the formulation that individually exceed their solubility limit in the water phase; these are materials that generally have solubilities of less than 1% in distilled water, however, water phase components such as salts may decrease the solubility of certain oils resulting in their partitioning into the oil phase;

"water phase" in a oil-in-water emulsion refers to the water present and any components that are water soluble, i.e., have not exceeded their solubility limit in water;

"(meth)acrylate monomers" are acrylic acid esters or methacrylic acid esters of alcohols;

As used herein, the term "silica sol" refers to a dispersion of discrete, amorphous silica particles in a liquid, typically water.

DETAILED DESCRIPTION

The present invention provides a pressure-sensitive adhesive comprising the reaction product of:

(a) a (meth)acrylate copolymer comprising:
  (i) 85 to 99 parts by weight of an (meth)acrylic acid ester of non-tertiary alcohol, said alcohol having from 1 to 14 carbon atoms, preferably with the average number of carbon atoms being from about 4 to about 12;
  (ii) 1 to 15 parts by weight of an acid functional monomer;
  (iii) 0 to 10 parts by weight of a second, non-acid functional, polar monomer;
  (iv) 0 to 5 parts vinyl monomer;
  (v) 0 to 1 part of a multifunctional (meth)acrylate; and
(b) 0.005 to 0.5 parts by weight of an aziridinyl silane, relative to 100 parts of polymer (a), and
(c) optionally 1 to 8 parts by weight, based on 100 parts of polymer (a), of a silica nanoparticle component, selected from acicular silica nanoparticles and spherical nanoparticles having an average particle diameter of 20 nanometers or less.

The present invention further provides a latex comprising:
(a) 30 to about 70 weight percent, based on the total weight of the emulsion, of the above-described adhesive composition, and
(b) 30 to 70 weight percent of an aqueous phase comprising a surfactant, based on the total weight of the emulsion.

Preferably the emulsion comprises about 50 to about 65 percent by weight total solids and about 35 to about 50 percent by weight aqueous phase, most preferably about 55 to about 62 percent by weight solid phase and about 38 to about 45 percent by weight aqueous phase, based upon the total weight of the emulsion, in order to minimize the aqueous phase and thus conserve energy during the drying of the latex, in order to minimize storage and shipping costs, and in order to maximize plant productivity. The emulsion may be coated and dried to produce a pressure-sensitive adhesive.

When combined, the aziridine group of the aziridinyl silane coupling agent reacts with the pendent acid functional groups of the polymer. The silane group of the aziridinyl silane coupling agent reacts with the surface of the silica nanoparticles to produce a composite adhesive. Thus, the composition, when cured, provides a nanoparticle-polymer composite where the polymer is covalently bonded to the silica nanoparticles. In some embodiments, it has been observed that the shear strength of the adhesive increases upon heating. It is believed that adjacent silane groups form siloxane bonds (Si—O—Si), effectively crosslinking the composition.

The (meth)acrylate ester monomer useful in preparing the adhesive polymer is a hydrophobic monomeric (meth)acrylic ester of a non-tertiary alcohol, which alcohol contains from 1 to 14 carbon atoms and preferably an average of from 4 to 12 carbon atoms.

Examples of monomers suitable for use as the acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 1-dodecanol, 1-tridecanol, 1-tetradecanol and the like. In some embodiments, the preferred acrylate ester monomer is the ester of acrylic acid with butyl alcohol or isooctyl alcohol, or a combination thereof, although combinations of two or more different acrylate ester monomer are suitable.

The acrylate ester monomer is present in an amount of 85 to 99 parts by weight based on 100 parts total monomer content used to prepare the polymer (i.e. the total of i through v in the composition supra). Preferably acrylate ester monomer is present in an amount of 90 to 95 parts by weight based on 100 parts total monomer content.

The polymer further comprises an acid functional monomer, where the acid functional group may be an acid per se, such as a carboxylic acid, or a salt thereof such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the present invention are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 1 to 15 parts by weight, preferably 1 to 5 parts by weight, based on 100 parts by weight total monomer.

The polar monomers useful in preparing the adhesive are both somewhat oil soluble and water soluble, resulting in a distribution of the polar monomer between the aqueous and oil phases in an emulsion polymerization. Useful second polar monomers are non-acid functional.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) acrylates including 2-(2-ethoxyethoxy) ethyl acrylate, 2-ethoxyethyl acrylate, 2-methoxyethoxyethyl acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone.

When used, vinyl monomers useful in the acrylate polymer include vinyl esters (e.g., vinyl acetate and vinyl propionate), styrene, substituted styrene (e.g., α-methyl styrene), vinyl halide, and mixtures thereof Such vinyl monomers are generally used at 0 to 5 parts by weight, preferably 1 to 5 parts by weight, based on 100 parts by weight total monomer.

In order to increase cohesive strength of the coated adhesive composition, a multifunctional (meth)acrylate may be incorporated into the blend of polymerizable monomers. Multifunctional acrylates are particularly useful for emulsion polymerization. Examples of useful multifunctional (meth) acrylate include, but are not limited to, di(meth)acrylates, tri(meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tr(meth)iacrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinker may be present in amounts from 0.01 parts to 1 part based on 100 parts total monomers of the adhesive composition.

The adhesive composition further comprises an aziridinyl silane coupling agent, in addition to the (meth)acrylate copolymer and the silica nanoparticle component. Many aziridinyl silane compounds are known and reference may be made to U.S. Pat. No. 3,243,429 (Ham), U.S. Pat. No. 3,711,466 (Uelzmann et al.) and U.S. Pat. No. 4,026,880 (Mitchell), each incorporated herein by reference.

The aziridinyl silane is generally added in amounts of 0.005 to 0.5 parts by weight, relative to 100 parts of polymer (a). More specifically the aziridinyl silane is added in amounts such that the molar ratio of the aziridine groups of the aziridinyl silane to the acid functional groups of the polymer is in the range of 1:1500 to 1:300, preferably 1:500 to 1:1000.

The aziridinyl silane is of the formula:

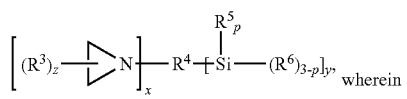 wherein $R^3$ is $C_1$-$C_4$ alkyl group attached to carbon 1 and/or carbon 2, and z is 0, 1 or 2;

z is 0, 1, or 2; preferably 0 or 1

$R^4$ is a polyvalent alkylene of valency x+y, preferably a divalent alkylene, optionally substituted by one or more catenary oxygen or nitrogen atoms, ester groups, urea groups and/or urethane groups, $R^5$ is a hydrolysable group, such as acetoxy, alkoxy, and halide groups $R^6$ is a monovalent alkyl or aryl group,
x is 1 or 2, preferably 1;
y is 1 or 2, preferably 1 and
p is 1, 2 or 3.

In one method, the aziridinyl silane may be prepared by reacting an aziridine compound having nucleophilic or electrophilic functional groups, with a silane compound having a co-reactive functional group. Useful reactive functional groups include, but are not limited to, hydroxyl, amino, acetoacetyl, azlactonyl, carboxyl, isocyanato, epoxy, acyl halide, and cyclic anhydride groups. Preferred among these is carboxyl, hydroxyl, amino, azlactonyl and isocyanato groups. Where the reactive functional group is an isocyanato functional group, the co-reactive functional group preferably comprises a secondary amino or hydroxyl group. Where the pendent reactive functional group comprises a hydroxyl group, the co-reactive functional group preferably comprises a carboxyl, ester, acyl halide, isocyanato, epoxy, anhydride, azlactonyl or oxazolinyl group. Where the pendent reactive functional group comprises a carboxyl group, the co-reactive functional group preferably comprises a hydroxyl, amino, epoxy, isocyanate, or oxazolinyl group.

This may be simply illustrated by the reaction of a hydroxy functional aziridine compound with an isocyanate functional silane compound:

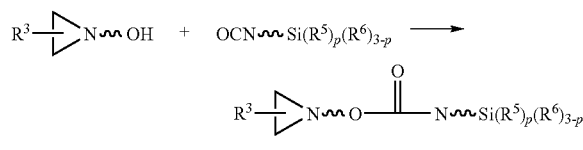

Thus, the present invention may use aziridinyl silanes of the formula:

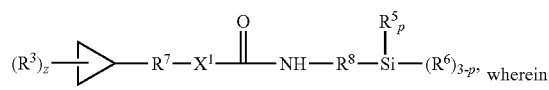

$R^3$ is H or a $C_1$-$C_4$ alkyl group,
$R^7$ and $R^8$ are each independently divalent alkylene,
$X^1$ is —$NR^3$— or —O—,
$R^5$ is a hydrolysable group,
$R^6$ is a monovalent alkyl or aryl group, and
p is 1, 2 or 3.

By another method, the aziridinyl silanes may be prepared by addition of an aziridine to a vinyl silane, in the presence of Na/NaNH$_2$, as described in Nametkin, N. S., Perchenko, V. N., and Grushevenko, I. A, *Dokl. Chem.* (*Engl. Transl.*), 158, 1964, 898-901. as shown below:

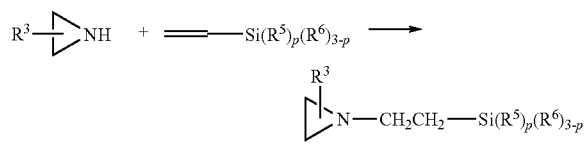

By another method, the aziridinyl silanes may be prepared by Michael addition of an aziridine with an acryloyl functional silane compound, as described in U.S. Pat. No. 3,243,429 (Ham).

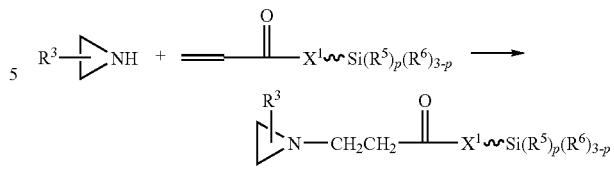

In a variation of the above-depicted Michael addition, an N-alkylamino silane can undergo 1,4-Michael addition to an acryloyl functional aziridine compound as described in U.S. Pat. No. 4,026,880 (Mitchell).

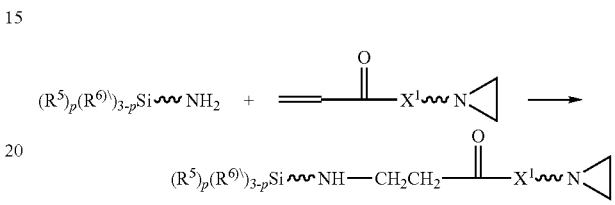

Thus, the present invention may use aziridinyl silanes of the formula:

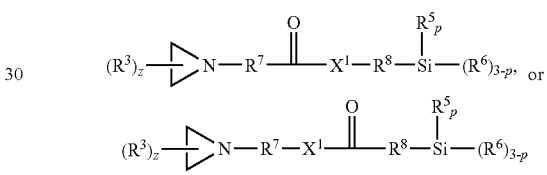

wherein
$R^3$ is $C_1$-$C_4$ alkyl group, and z is 0, 1 or 2;
Z is 0, 1 or 2,
$R^7$ and $R^8$ are each independently divalent alkylene, optionally containing one or more catenary oxygen or nitrogen atoms,
$X^1$ is —$NR^3$— or —O—,
$R^5$ is a hydrolysable group,
$R^6$ is a monovalent alkyl or aryl group, and
p is 1, 2 or 3.

It is believed that the aziridine group reacts with the pendent acid functional groups of the (meth)acrylate copolymer to form a carboxyethyleneamino linkage. The silane groups react with the surface silanol groups of the silica component to form siloxane links with the surface. In one embodiment, the cured composite may be of the structure, with the optional monomer units not shown:

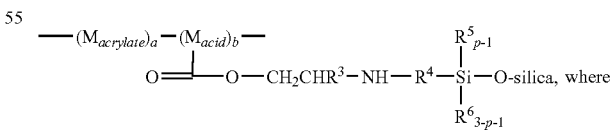

$M_{acrylate}$ represents polymerized monomer units derived from (meth)acrylate monomers, $M_{acid}$ represents polymerized monomer units derived from acid functional monomers, a and b are integers of at least one, such that a+b is polymeric, $R^3$ is H or a $C_1$-$C_4$ alkyl group, $R^4$ is a divalent alkylene, optionally substituted by one or more catenary oxygen atoms, ester groups, urea groups or urethane groups, $R^5$ is a hydrolysable group, $R^6$ is a monovalent alkyl or aryl group, p is 1, 2 or 3, and "silica" represents a silica particle. It will be understood that the silane group may form 1 or more siloxane bonds with the silica particles, and one or more siloxane bonds with adjacent silane groups on the surface of the silica particle. It will further be understood that the $R^3$ group may be on the indicated carbon, or attached to the carbon adjacent the ester oxygen atom, depending on the ring opening of the aziridine group.

The composition further optionally comprises silica particle component selected from acicular (needle-like) silica particles having a high aspect ratio, and substantially spherical silica particles, having and average particle diameter of 20 nanometers or less. In one embodiment the silica nanoparticles are acicular, generally used and compounded in the form of a colloidal dispersion that does not readily precipitate or agglomerate. The acicular colloidal silica particles should have a uniform thickness of 5 to 40 nm, a diameter $D_1$ of 40 to 500 nm (as measured by dynamic light-scattering method) and a degree of elongation $D_1/D_2$ of 5 to 30, wherein $D_2$ means a diameter in nm calculated by the equation $D_2 = 2720/S$ and S means specific surface area in $m^2/g$ of the particle, as is disclosed in the specification of U.S. Pat. No. 5,221,497, incorporated herein by reference.

U.S. Pat. No. 5,221,497 discloses a method for producing acicular silica nanoparticles by adding water-soluble calcium salt, magnesium salt or mixtures thereof to an aqueous colloidal solution of active silicic acid or acidic silica sol having a mean particle diameter of 3 to 30 nm in an amount of 0.15 to 1.00 wt. % based on CaO, MgO or both to silica, then adding an alkali metal hydroxide so that the molar ratio of $SiO_2/M_2O$ (M: alkali metal atom) becomes 20 to 300, and heating the obtained liquid at 60 to 300° C. for 0.5 to 40 hours. The colloidal silica particles obtained by this method are elongate-shaped silica particles that have elongations of a uniform thickness within the range of 5 to 40 nm extending in only one plane.

The acicular silica sol may also be prepared as described by Watanabe et al. in U.S. Pat. No. 5,597,512. Briefly stated, the method comprises: (a) mixing an aqueous solution containing a water-soluble calcium salt or magnesium salt or a mixture of said calcium salt and said magnesium salt with an aqueous colloidal liquid of an active silicic acid containing from 1 to 6% (w/w) of $SiO_2$ and having a pH in the range of from 2 to 5 in an amount of 1500 to 8500 ppm as a weight ratio of CaO or MgO or a mixture of CaO and MgO to $SiO_2$ of the active silicic acid; (b) mixing an alkali metal hydroxide or a water-soluble organic base or a water-soluble silicate of said alkali metal hydroxide or said water-soluble organic base with the aqueous solution obtained in step (a) in a molar ratio of $SiO_2/M_2O$ of from 20 to 200, where $SiO_2$ represents the total silica content derived from the active silicic acid and the silica content of the silicate and M represents an alkali metal atom or organic base molecule; and (c) heating at least a part of the mixture obtained in step (b) to 60° C. or higher to obtain a heel solution, and preparing a feed solution by using another part of the mixture obtained in step (b) or a mixture prepared separately in accordance with step (b), and adding said feed solution to said heel solution while vaporizing water from the mixture during the adding step until the concentration of $SiO_2$ is from 6 to 30% (w/w). The silica sol produced in step (c) typically has a pH of from 8.5 to 11.

Useful acicular silica nanoparticles may be obtained as an aqueous suspension under the trade name SNOWTEX-UP by Nissan Chemical Industries (Tokyo, Japan). The mixture consists of 20-21 % (w/w) of acicular silica, less than 0.35% (w/w) of $Na_2O$, and water. The particles are about 9 to 15 nanometers in diameter and have lengths of 40 to 300 nanometers. The suspension has a viscosity of <100 mPas at 25° C., a pH of about 9 to 10.5, and a specific gravity of about 1.13 at 20° C.

Other useful silica nanoparticle may be obtained as an aqueous suspension under the trade name SNOWTEX-PS-S and SNOWTEX-PS-M by Nissan Chemical Industries, having a morphology of a string of pearls. The mixture consists of 20-21% (w/w) of silica, less than 0.2% (w/w) of $Na_2O$, and water. The SNOWTEX-PS-M particles are about 18 to 25 nanometers in diameter and have lengths of 80 to 150 nanometers. The particle size is 80 to 150 by dynamic light scattering methods. The suspension has a viscosity of <100 mPas at 25° C., a pH of about 9 to 10.5, and a specific gravity of about 1.13 at 20° C. The SNOWTEX-PS-S has a particle diameter of 10-15 nm and a length of 80-120 nm.

In another embodiment the silica nanoparticle component comprises spherical silica nanoparticles having an average particle diameter of 20 nanometers of less. The colloidal silicas used in this composition are dispersions of submicron size silica particles in an aqueous or in a water/organic solvent mixture and having average particle diameter of 20 nanometers or less, preferably 10 nanometers or less, and more preferably 5 nanometers or less. The average particle size may be determined using transmission electron microscopy. Further, the nanoparticles generally have a surface area greater than about 150 $m^2$/gram, preferably greater than 200 $m^2$/gram, and more preferably greater than 400 $m^2$/gram. For the greatest improvement in shear values, the particles preferably have narrow particle size distributions, that is, a polydispersity of 2.0 or less, preferably 1.5 or less. If desired, minor amounts of larger silica particles may be added, but such additions do not contribute to the increase in shear values. The nanoparticles used in the invention may be acid stabilized or base stabilized.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del., USA), NYACOL (available from Nyacol Co., Ashland, Mass.) or NALCO (manufactured by Ondea Nalco Chemical Co., Oak Brook, Ill. USA). One useful silica sol is NALCO 2326 available as a silica sol with mean particle size of 5 nanometers, pH 10.5, and solid content 15% by weight.

Non-aqueous silica sols (also called silica organosols) may also be used and are silica sol dispersions wherein the liquid phase is an organic solvent, or an aqueous organic solvent. In the practice of this invention, the silica sol is chosen so that its liquid phase is compatible with the emulsion, and is typically aqueous or an aqueous organic solvent.

The (meth)acrylate copolymers used herein may be prepared by any conventional free radical polymerization method, including solution, radiation, bulk, dispersion, emulsion, and suspension processes. The (meth)acrylate copolymers polymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado). Each describes adhesive compositions, and the descriptions of polymerization processes are incorporated herein by reference. Preferably, the (meth)acrylate copolymers is prepared by an emulsion polymerization process in the presence of a free-radical initiator.

Water-soluble and oil-soluble initiators useful in preparing the (meth)acrylate copolymers used in the present invention are initiators that, on exposure to heat, generate free-radicals which initiate (co)polymerization of the monomer mixture. Water-soluble initiators are preferred for preparing the (meth) acrylate copolymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO 64 (2,2'-azobis(isobutyronitrile)) and VAZO 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of monomer components in the pressure-sensitive adhesive.

The copolymerizable emulsion mixture may optionally further comprise chain transfer agents to control the molecular weight of the resultant (meth)acrylate copolymers. Examples of useful chain transfer agents include but are not limited to those selected from the group consisting of carbon tetrabromide, alcohols, mercaptans, and mixtures thereof. The preferred chain transfer agents are isooctylthioglycolate and carbon tetrabromide. The emulsion mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

Polymerization via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof.

Useful anionic surfactants include but are not limited to those whose molecular structure includes at least one hydrophobic moiety selected from the group consisting of from about $C_6$— to $C_{12}$-alkyl, alkylaryl, and/or alkenyl groups as well as at least one anionic group selected from the group consisting of sulfate, sulfonate, phosphate, polyoxyethylene sulfate, polyoxyethylene sulfonate, polyoxyethylene phosphate, and the like, and the salts of such anionic groups, wherein said salts are selected from the group consisting of alkali metal salts, ammonium salts, tertiary amino salts, and the like. Representative commercial examples of useful anionic surfactants include sodium lauryl sulfate, available from Stepan Chemical Co. as POLYSTEP B-3; sodium lauryl ether sulfate, available from Stepan Chemical Co. as POLYSTEP B-12; and sodium dodecyl benzene sulfonate, available from Rhone-Poulenc as SIPONATE DS-10.

Useful nonionic surfactants include but are not limited to those whose molecular structure comprises a condensation product of an organic aliphatic or alkyl aromatic hydrophobic moiety with a hydrophilic alkylene oxide such as ethylene oxide. The HLB (Hydrophilic-Lipophilic Balance) of useful nonionic surfactants is about 10 or greater, preferably from about 10 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present invention include but are not limited to nonylphenoxy or octylphenoxy poly (ethyleneoxy)ethanols available from Rhone-Poulenc as the IGEPAL CA or CO series, respectively; $C_{11}$-$C_{15}$ secondary-alcohol ethoxylates available from Union Carbide as the TERGITOL 15-S series; and polyoxyethylene sorbitan fatty acid esters available from ICI Chemicals as the TWEEN series of surfactants.

Useful cationic surfactants include alkylammonium salts having the formula $C_nH_{2n+1}N^+(CH_3)_3X^-$, where X is OH, Cl, Br, $HSO_4$ or a combination thereof, and where n is an integer from 8 to 22, and the formula $C_nH_{2n+1}N^+(C_2H_5)_3X^-$, where n is an integer from 12 to 18; gemini surfactants, for example those having the formula: $[C_{16}H_{33}N^+(CH_3)_2C_mH_{2m+1}]X^-$, wherein m is an integer from 2 to 12 and X is as defined above; aralkylammonium salts such as, for example, benzalkonium salts; and cetylethylpiperidinium salts, for example, $C_{16}H_{33}N^+(C_2H_5)(C_5H_{10})X^-$, wherein X is as defined above.

Alternatively, the surfactant may be an ionic surfactant copolymerizable with the monomer mixtures, and is incorporated into the polymer chain during polymerization. Examples of useful copolymerizable ionic surfactants include but are not limited to those described in WO 89/12618 (Tang et al.). The surfactants described therein have a hydrophobic portion containing alpha-beta ethylenic unsaturation, a hydrophilic portion containing a poly(alkyleneoxy) segment, and an ionic segment.

According to WO 89/12618, the reactive surfactants arise from successive condensation polymerizations of an ethylenically-unsaturated alcohol with a prescribed amount of a first cyclic ether, e.g., propylene oxide, butylene oxide or a mixture thereof, followed by condensation with a prescribed amount of ethylene oxide. Cationic or anionic end-group functionality is added via the terminal hydroxyl group, as desired.

The ionic copolymerizable surfactant has at least one group, preferably one group, capable of reacting with the copolymerizable monomer mixture. Such reactive groups include but are not limited to those groups selected from the group consisting of ethylenically unsaturated groups such as vinyl groups, acrylate groups, etc.

The preferred copolymerizable surfactant, which has the trade name MAZON SAM-211, is available from PPG Industries, Inc. and is described as an alkylene polyalkoxy ammonium sulfate, wherein the number of alkoxy groups is between about 5 and about 25, with a typical example having about 15 to about 20 ethoxy groups. Examples of additional useful copolymerizable surfactants include alkyl allyl sulfosuccinates such as TREM-LF40, available from Diamond Shamrock Company. Additional useful copolymerizable surfactants are disclosed in U.S. Pat. Nos. 3,925,442 and 3,983, 166, assigned to The Kendall Company, both incorporated by reference herein.

It is also envisioned that the emulsion of the present invention can be made using a mixture of a copolymerizable surfactant as delineated above and a typical ionic or nonionic noncopolymerizable surfactant commonly known in the art of latex polymerization, in place of the ionic copolymerizable surfactant above. Example of such noncopolymerizable surfactants can be found in "Emulsion Polymerization: theory and practice", by D. C. Blackley, New York, J. Wiley (1975), incorporated by reference herein. In some embodiments, the surfactant mixture comprises about 40 to about 99.5 percent by weight of an ionic copolymerizable surfactant and about 0.5 to about 60 percent by weight of a noncopolymerizable surfactant, based upon the total weight of the surfactant mixture.

Preferably, the emulsion polymerization of the (meth)acrylate copolymer is carried out in the presence of anionic surfactant(s). A useful range of emulsifier concentration is from about 0.5 to about 8 weight percent, preferably from about 1 to about 5 weight percent, based on the total weight of all monomers of the emulsion pressure-sensitive adhesive.

In emulsion polymerization a reaction occurs in micelles or emulsion microdrops suspended in aqueous medium. Any heat generated in the microdrops or micelles is quickly moderated by the effect of the heat capacity of the surrounding water phase. Emulsion polymerization proceeds with better control of exothermic reactions, and the resulting adhesive composition is non-flammable as the aqueous medium is the dominant component.

The pressure-sensitive adhesives of the present invention are prepared by a batch, continuous or semi-continuous emulsion polymerization process. The batch polymerization generally comprises the steps of:
(a) making a monomer premix comprising
  (i) a (meth)acrylic acid ester monomer;
  (ii) an acid functional monomer;
  (iii) optionally a non-acid functional polar monomer;
  (iv) optionally a vinyl monomer;
  (v) optionally a multifunctional (meth)acrylate;
  (vi) optionally a chain transfer agent,
(b) combining said premix with a water phase comprising
  (i) water,
  (ii) a surfactant selected from the group consisting of anionic surfactants, nonionic surfactants, cationic surfactants, amphoteric surfactants, polymeric surfactants, and mixtures thereof,
  (iii) a water soluble free radical initiator,
(c) concurrently agitating and heating said emulsion to a temperature of about 30° C. to about 80° C., and permitting polymerization of said monomers in the oil-in-water emulsion until a polymeric latex is formed. It will be understood that other mixtures may be used. For example, the acid functional monomer, or other hydrophilic monomers, may be added to the aqueous solution. In addition, once the emulsion mixture is prepared, the monomers may partition between the oil phase and the water phase, according to their respective partition coefficients.

In the semicontinuous process, a flask is charged with a seed monomer mixture comprising deionized (DI) water, surfactant, acid functional monomers, (meth)acrylate ester monomers, optional co-polymerizable monomers, plus any optional chain transfer agents, pH modifiers or other additives. The mixture is stirred and heated under an inert atmosphere such as a nitrogen blanket. When the mixture has reached induction temperature, typically about 50 to about 70° C., the first initiator is added to initiate the polymerization and the reaction is allowed to exotherm. After the seed reaction is completed, the batch temperature is then raised to the feed reaction temperature, about 70 to about 85° C. At the feed reaction temperature, the monomer pre-emulsion comprising deionized water, surfactant, acid functional monomers, acrylate ester monomers, optional co-polymerizable monomers, including optional polar monomers, chain transfer agents or other additives is added to the stirred flask over a period of time, typically 2 to 4 hours, while the temperature is maintained. At end of the feed reaction, the second initiator charge, if used, is added to the reaction to further reduce residual monomers in the emulsion.

A neutralizing agent may be employed in the preparation of this polymer. It may be employed at a level sufficient to neutralize all or a part of the acid groups of the polymer. Generally, less than 50% of acid groups are neutralized. Neutralization is achieved via the use of an alkali metal hydroxide or a combination of an alkali metal hydroxide with a minor amount of another neutralizing agent. A wide variety of other neutralizing agents may be used as will be understood by those skilled in the art. The selection of the other neutralizing agent, and the amount employed may be varied to achieve a desired result. However, the type and amount selected must not render the adhesive non-dispersible. Preferably ammonium, sodium and potassium hydroxide are used as neutralizing agents.

The pH of the emulsion is typically about greater than 7, preferably 8 or greater, and preferably less than 10. The acidity of the emulsion may be modified following latex formation using a pH modifier such as a basic solution (e.g., solutions of sodium hydroxide, ammonium hydroxide, lithium hydroxide and the like) or buffer solutions (e.g., sodium bicarbonate and the like), to less acidic levels. It is believed there is a balance between the pH of the composition and adhesive performance thereof. As the acid groups of the polymer are neutralized by the addition of base, the stability of the emulsion increases, but hydrogen bonding between the acid groups of the polymer and the silica nanoparticles is reduced.

In one embodiment, an emulsion of the (meth)acrylate copolymer is combined with the (optional) particle component and aziridinyl silane, followed by optional removal of the water and co-solvent (if used) via evaporation, thus leaving the particle component dispersed in the (meth)acrylate copolymer. Upon evaporation, the aziridine group of the aziridinyl silane coupling agent will react with the pendent acid functional groups of the polymer, and the silane group of the aziridinyl silane coupling agent will react with the surface of the silica particles to produce a composite adhesive. The silane groups may further effectively crosslink the adhesive composition by forming siloxane bonds with adjacent silane groups.

It is preferred that the particle component be blended under conditions of low shear to avoid precipitation of the (meth) acrylate copolymer emulsion. The evaporation step can be accomplished for example, via distillation, rotary evaporation or oven drying. Prior to drying, the emulsion generally does not exhibit pressure-sensitive adhesive properties, so drying to less than 5 wt. % water, preferably less than 1 wt. % water is desirable. It will be understood that the water content of the adhesive may increase with time, as the result of humidity. It is preferred to dry after coating of a substrate.

The emulsion pressure-sensitive adhesives of the invention may also contain one or more conventional additives. Preferred additives include tackifiers, plasticizers, dyes, antioxidants, leveling agents, hindered amine light stabilizers (HALS), oxygen inhibitors, wetting agents, rheology modifiers, defoamers, biocides, and the like. Such additives can be used if they do not affect the adhesive properties of the emulsion pressure-sensitive adhesives. All of these additives and the use thereof are well known in the art.

Also useful as additives to the present compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl)[3,5-bis(1,1-dimethylethyl-4-hydroxyphenyl) methyl]butylpropanedioate, available as Tinuvin™144, from CIBA-GEIGY Corporation, Hawthorne, N.Y.

The following UV absorbers and combinations thereof in concentrations of less than parts by weight based on the total monomer composition, may produce desirable results: bis(1, 2,2,6,6-pentamethyl-4-piperidinyl)(3,5-bis( 1,1-dimethylethyl 1-4-hydroxyphenyl)methyl)butylpropanedioate, 2-ethylhexyl-2-cyano-3,3'-diphenylacrylate, 2-hydroxy-4-n-octoxybenzophenone, 2-(2'-hydroxy-5 '-methylphenyl) benzotriazole, poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy, and Uvinul™ D-50 and MS-40, sold by BASF Wyandotte Inc., Parsippany, N.J. Concentrations of UV absorbers, however, in the range of 1 to 5 percent based on the total weight of the composition are preferred.

If tackifiers are used, then up to about 40% by weight, preferably less than 30% by weight, and more preferably less than 5% by weight based on the dry weight of the total adhesive composition, would be suitable. In some embodiments, 25 to about 60 phr (parts per hundred parts resin) based on dry weight of the total adhesive component would also be suitable. Suitable tackifiers for use with acrylate emulsions include rosin acids, rosin esters, terpene phenolic resins, hydrocarbon resins, and cumarone indene resins. The type and amount of tackifier can affect properties such as contactability, bonding range, bond strength, heat resistance and specific adhesion. The tackifier will generally be used in the form of an aqueous dispersion. Commercially available tackifiers that are suitable include TACOLYN 1070, 5001 and 5002 (aqueous, 55% solids synthetic resin dispersions based on low molecular weight thermoplastic resins, available from Hercules Inc.), SE1055 (an aqueous dispersion of a rosin ester, available from Hercules Inc.), ESCOREZ 9271 (an aliphatic hydrocarbon resin emulsion, available from Exxon), DERMULSENE 82, DERMULSENE 92, DERMULSENE DT or DERMULSENE DT50 (aqueous dispersions of modified terpene phenolic resins, available from DRT) and AQUATAK 4188 (a modified rosin ester, available from Arizona Chemical Company).

The emulsion containing the (meth)acrylate copolymer, aziridinyl silane and optional silica particles are easily coated upon suitable flexible backing materials by conventional coating techniques to produce adhesive coated sheet materials. The flexible backing materials may be any material conventionally utilized as a tape backing, optical film or any other flexible material. Typical examples of flexible backing materials employed as conventional tape backing that may be useful for the adhesive compositions include those made of paper, plastic films such as polypropylene, polyethylene, polyurethane, polyvinyl chloride, polyester (e.g., polyethylene terephthalate), cellulose acetate, and ethyl cellulose.

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure-sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-50 microns (dry thickness), preferably about 25 microns, are contemplated. The emulsions (containing the adhesive polymer, silica nanoparticles and water) may be of any desirable concentration for subsequent coating, but is typically between 30 to 70 wt. % water, and more typically between 50 and 65 wt. % water. The desired concentration may be achieved by further dilution of the emulsion, or by partial drying.

While the adhesives of the present invention are well suited for use in wet lamination applications, the adhesives also perform well in dry lamination applications, wherein the resultant lamination is subjected to high heat and humidity conditions.

To begin, pressure-sensitive adhesives are coated onto backings with the desired coating thickness and then dried before lamination. Then, water is sprayed onto glass or other substrate, sometimes along with a small amount of surfactant to lower the water's surface tension, to obtain a thin water layer on the substrate surface. The film is then positioned properly on the substrate, and most of the excess of water is squeezed out to yield a substrate/PSA/film laminate. The remaining water in the laminate will be evaporated in a few days, depending on the materials used in the laminate.

For dry lamination, a adhesive composition is coated onto films (backings) with the desired coating thickness, and then dried before lamination. Such PSA coated film is then adhered onto substrate surface with pressure and/or high temperature to bond the film onto the substrate surface.

Suitable materials useful as the flexible support or backing for the adhesive articles of the invention include, but are not limited to, paper, latex saturated paper, polymeric film, cellulose acetate film, ethyl cellulose film, cloth (i.e., woven or nonwoven sheeting formed of synthetic or natural materials), metallic foil, and ceramic sheeting.

Examples of materials that can be included in the flexible support include polyolefins (such as polyethylene, polypropylene (including isotatic polypropylene), polystyrene, polyester, polyvinyl alcohol, poly(ethylene terephthalate), poly (butylene terephthalate), poly(caprolactam), poly(vinylidine fluoride), and the like. Commercially available backing materials useful in the invention include kraft paper (available from Monadnock Paper, Inc.); cellophane (available from Flexel Corp.); spun-bond poly(ethylene) and polypropylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

The flexible support may also comprise a release-coated substrate. Such substrates are typically employed when an adhesive transfer tape is provided. Examples of release-coated substrates are well known in the art. They include, by way of example, silicone-coated kraft paper and the like. Tapes of the invention may also incorporate a low adhesion backsize (LAB). Typically this LAB is applied to the tape backing surface that is opposite that bearing the pressure-sensitive adhesive. LABs are known in the art.

This invention is further illustrated by the following examples that are not intended to limit the scope of the invention. In the examples, all parts, ratios and percentages are by weight unless otherwise indicated. The following test methods were used to evaluate and characterize the emulsion PSAs produced in the examples. All materials are commercially available, for example from Aldrich Chemicals, unless otherwise indicated or described.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Test Methods

Peel Adhesion Test

The test method used was similar to test method ASTM D 3330-78 except that a glass substrate was used in place of stainless steel. Tape samples were prepared by coating adhesives onto PET film and dried in a forced air oven at 70° C. for 5 minutes to give an adhesive dry coating thickness of about 25.4 micrometers (1 mil). Two 1.3 centimeter (0.5 inch) strips of these tapes were adhered to a glass plate by rolling a 2 kilogram (4.5 pounds) roller onto the tape. The two tape samples were averaged. Platen speed was 229 centimeters per minute (90 inches per minute). Peel force was measured in ounces per 0.5 inch and converted to Newtons per decimeter.

Shear Strength Test

The test method used was similar to test method ASTM D-3654-78, PSTC-7. Tape samples were prepared by coating adhesives onto PET film and dried in a forced air oven at 70° C. for 5 minutes to give an adhesive dry coating thickness of about 25.4 micrometers (1 mil). Strips of these tapes 1.3 centimeter (0.5 inch) wide were adhered to stainless steel plates and cut down to leave 1.3 centimeter by 1.3 centimeter (0.5 inch by 0.5 inch) square on the steel plates. A weight of 2 kilograms (4.5 pounds) was rolled over the adhered portion. A weight of 1,000 grams was attached to each sample which was suspended until the sample failed. The time of failure as well as the mode of failure was noted. Samples were run in triplicate and averaged. The tests were run at 23° C. and 50% relative humidity unless otherwise specified.

Materials

| Abbreviation or Trade Designation | Description |
|---|---|
| PSA-I | Acrylic emulsion adhesive (FASTBOND 49) commercially available from 3M Company, St. Paul, MN. |
| PSA-II | Robond PS-90 Acrylic emulsion adhesive, commercially available from Rohm & Haas, Philadelphia, PA. |
| Aziridine I | 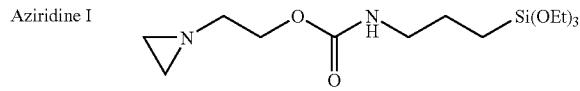 |
| Aziridine II | 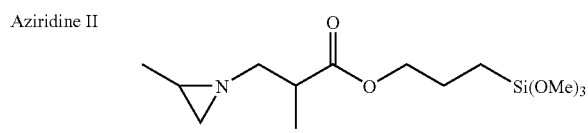 |
| Aziridine III | 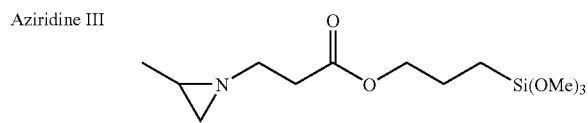 |
| NALCO 2326 | Silica particles of approximately 5 nanometer size commercially available from Nalco, Naperville, IL. |
| SNOWTEX UP | Silica particles available from Nissan Chemical Industries Ltd., Chiba - Prefecture, Japan. |

Preparative Example 1

Aziridine I

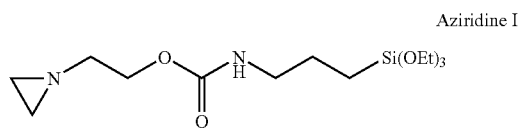

While cooling in an ice bath, 10.00 g (40 mmol) of 3-isocyanatopropyl triethoxysilane (Gelest Inc., Tullytown, Pa.) was added to 3.5 g (40 mmol) 1-aziridine ethanol (Aldrich Chemical Co., Milwaukee, Wis.). The mixture was stirred for 5 minutes in the ice bath, then 5 minutes at room temperature. 13.5 g of ethanol was added to form a solution of aziridine coupling agent (Aziridine I).

Preparative Example 2

Aziridine II

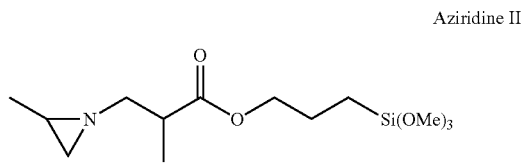

A mixture of 6.30 g (100 mmol) 2-methyl aziridine (Aldrich Chemical Co., Milwaukee, Wis.), 12.40 g (50 mmol) methacryloxypropyl trimethoxysilane, 50 mg (0.2 mmol) 3,5-di-tert-butyl-4-hydroxytoluene, and 5 drops of 1,8-diazabicyclo[5.4.0]undec-7-ene was placed in a jar and capped. The jar was heated at 70° C. for 72 hours. The mixture was then concentrated under vacuum to give 14.86 g of a yellow oil (Aziridine II).

Preparative Example 3

Aziridine III

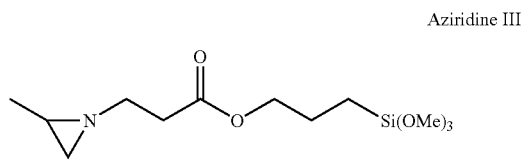

A mixture of 2.50 g (40 mmol) 2-methyl aziridine, 2.30 g (10 mmol) acryloxypropyl trimethoxysilane (Gelest Inc., Tullytown, Pa.), 5 mg 3,5-di-tert-butyl-4-hydroxytoluene, and 1 drop of 1,8-diazabicyclo[5.4.0]undec-7-ene was placed in a vial and capped. The vial was heated at 70° C. for 1 hour. The mixture was then concentrated under vacuum to give 2.62 g of a yellow oil (Aziridine III).

Example 1 and Comparative C1

The pH of PSA-I was increased by adding concentrated ammonium hydroxide to the solution, as it was being stirred with a magnetic stirrer. The increase in pH was monitored using a pH meter and the addition of base was stopped once the pH reached 9.0. All of the references to PSA-I below refer to the pH being increased to 9.0.

PSA-I was blended with various concentrations of SNOWTEX UP (by solids weight basis). Adhesive solutions were also prepared with and without Aziridine I, II, and III in a 1% Methanol solution as shown in Table 1. The Aziridine I, II, and III concentration in Table 1 is based on the weight percent of polymer. A comparative sample was also prepared with no Snowtex UP, Comparative Example C1. Peel Adhesion and Shear Strength were measured for tapes prepared from these adhesive emulsion solutions as described in the test methods above.

TABLE 1

PSA-I (pH 9.0) with Snowtex UP and Aziridine I, II, and III

| Example | Wt % Aziridine I | Wt % Aziridine II | Wt % Aziridine III | Wt % Snowtex UP | Peel Adhesion on Glass (N/dm) | Shear Strength Tests RT Hang Time (min) | 70° C. Hang Time (min) |
|---|---|---|---|---|---|---|---|
| C1 | — | — | — | — | 23 | 108 (c) | 10 (c) |
| 1A | — | — | — | 2 | 12 | 329 (c) | 10,000+ |
| 1B | 0.02 | — | — | — | 21 | 1300 (c) | 10,000+ |
| 1C | 0.02 | — | — | 2 | 11 | 530 (po) | 10,000+ |
| 1D | — | 0.02 | — | — | 17 | 1724 (po) | 7396 (po) |
| 1E | — | 0.02 | — | 2 | 13 | 646 (po) | 10,000+ |
| 1F | — | — | 0.02 | — | 16 | 348 (po) | 10,000+ |
| 1G | — | — | 0.02 | 2 | 16 | 350 (po) | 10,000+ |

Failure mode legend:

(c) stands for cohesive, (c/a) stands for cohesive/adhesive mix, (po) pop off

Example 2 and Comparative C1

PSA-I was blended with various concentrations of Nalco 2326 (by solids weight basis). Adhesive solutions were also prepared with and without Aziridine I, II, and III in a 1% Methanol solution as shown in Table 2. The Aziridine I, II, and III concentration in Table 2 is based on the weight percent of polymer. A comparative sample was also prepared with no Nalco 2326, Comparative Example C1. Peel Adhesion and Shear Strength were measured for tapes prepared from these adhesive emulsion solutions as described in the test methods above.

Example 3 and Comparative C2

PSA-II was blended with various concentrations of SNOWTEX UP (by solids weight basis). Adhesive solutions were also prepared with and without Aziridine I, II, and III in a 1% Methanol solution as shown in Table 3. The Aziridine I, II, and III concentration in Table 3 is based on the weight percent of polymer. A comparative sample was also prepared with no Snowtex UP, Comparative Example C2. Peel Adhesion and Shear Strength were measured for tapes prepared from these adhesive emulsion solutions as described in the test methods above.

TABLE 2

PSA-I (pH 9.0) with Nalco 2326 and Aziridine I, II, and III

| Example | Wt % Aziridine I | Wt % Aziridine II | Wt % Aziridine III | Wt % Nalco 2326 | Peel Adhesion on Glass (N/dm) | Shear Strength Tests RT Hang Time (min) | 70° C. Hang Time (min) |
|---|---|---|---|---|---|---|---|
| C1 | — | — | — | — | 23 | 108 (c) | 10 (c) |
| 2A | — | — | — | 2 | 14 | 229 (c) | 9 (c) |
| 2B | 0.02 | — | — | 2 | 10 | 1512 (c/a) | 569 |
| 2C | — | 0.02 | — | 2 | 11 | 280 (c/a) | 150 (p/o) |
| 2D | — | — | 0.02 | 2 | 10 | 527 (c) | 3 (c) |

Failure mode legend:

(c) stands for cohesive, (c/a) stands for cohesive/adhesive mix, (po) pop off

TABLE 3

PSA-II with Snowtex UP and Aziridine I, II and III

| Example | Wt % Aziridine I | Wt % Aziridine II | Wt % Aziridine III | Wt % Snowtex UP | Peel Adhesion on Glass (N/dm) | Shear Strength Tests | |
|---|---|---|---|---|---|---|---|
| | | | | | | RT Hang Time (min) | 70° C. Hang Time (min) |
| C2 | — | — | — | — | 42 | 185 (c) | 2 (c) |
| 3A | — | — | — | 2 | 37 | 738 (c) | 4397 (c) |
| 3B | 0.02 | — | — | — | 43 | 319 (po) | 10,000+ |
| 3C | 0.02 | — | — | 2 | 35 | 414 (po) | 10,000+ |
| 3D | — | 0.02 | — | — | 43 | 1183 (po) | 4406 (po) |
| 3E | — | 0.02 | — | 2 | 32 | 176 (po) | 149 (po) |
| 3F | — | — | 0.02 | — | 39 | 710 (po) | 10,000+ |
| 3G | — | — | 0.02 | 2 | 40 | 160 (po) | 67 (po) |

Failure mode legend:
(c) stands for cohesive,
(c/a) stands for cohesive/adhesive mix,
(po) pop off Example 4 and Comparative C2

PSA-II was blended with various concentrations of Nalco 2326 (by solids weight basis). Adhesive solutions were also prepared with and without Aziridine I, II, and III in a 1% Methanol solution as shown in Table 4. The Aziridine I, II, and III concentration in Table 4 is based on the weight percent of polymer. A comparative sample was also prepared with no Nalco 2326, Comparative Example C2. Peel Adhesion and Shear Strength were measured for tapes prepared from these adhesive emulsion solutions as described in the test methods above.

TABLE 4

PSA-II with Nalco 2326 and Aziridine I, II, and III

| Example | Wt % Aziridine I | Wt % Aziridine II | Wt % Aziridine III | Wt % Nalco 2326 | Peel Adhesion on Glass (N/dm) | Shear Strength Tests | |
|---|---|---|---|---|---|---|---|
| | | | | | | RT Hang Time (min) | 70° C. Hang Time (min) |
| C2 | — | — | — | — | 42 | 185 (c) | 2 (c) |
| 4A | — | — | — | 2 | 35 | 125 (c/a) | — |
| 4B | 0.02 | — | — | 2 | 42 | 164 (c/a) | — |
| 4C | — | 0.02 | — | 2 | 42 | 205 (c/a) | — |
| 4D | — | — | 0.02 | 2 | 45 | 147 (c/a) | — |

Failure mode legend:
(c) stands for cohesive,
(c/a) stands for cohesive/adhesive mix,
(po) pop off
(—) no measured

The invention claimed is:

1. A pressure-sensitive adhesive comprising the reaction product of:
   (a) a (meth)acrylate copolymer comprising:
      i. 85 to 99 parts by weight of an (meth)acrylic acid ester of non-tertiary alcohol;
      ii. 1 to 15 parts by weight of an acid functional monomer;
      iii. 0 to 10 parts by weight of a second, non-acid functional, polar monomer;
      iv. 0 to 5 parts vinyl monomer;
      v. 0 to 1 part of a multifunctional (meth)acrylate; and
   (b) 0.005 to 0.5 parts by weight of an aziridinyl silane, relative to 100 parts of polymer (a), and
   (c) optionally 1 to 8 parts by weight, of silica particles, relative to 100 parts of polymer (a).

2. The pressure-sensitive adhesive of claim 1, wherein said silica particles are acicular.

3. The pressure-sensitive adhesive of claim 2 wherein said silica particles have an average particle diameter of 9-25 nm with a length of 40-300 nm.

4. The pressure-sensitive adhesive of claim 1 wherein said silica nanoparticles are substantially spherical have an average particle diameter of 20 nanometers or less.

5. The pressure-sensitive adhesive of claim 1 wherein said silica nanoparticles have an average particle diameter of 10 nanometers or less.

6. The pressure-sensitive adhesive of claim 1 wherein said acid functional group of said acid functional monomer is at least partially neutralized in the polymer.

7. The pressure-sensitive adhesive of claim 1 wherein said aziridinyl silane is of the formula:

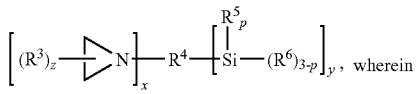, wherein $R^3$ is $C_1$-$C_4$ alkyl group,
z is 0, 1, or 2;
$R^4$ is a polyvalent alkylene of valency x+y, preferably a divalent alkylene, optionally substituted by one or more catenary oxygen or nitrogen atoms, ester groups, urea groups and/or urethane groups,
$R^5$ is a hydrolysable group,
$R^6$ is a monovalent alkyl or aryl group,
x is 1 or 2, preferably 1;
y is 1 or 2, preferably 1 and
p is 1, 2 or 3.

8. The pressure-sensitive adhesive of claim 1 wherein said aziridinyl silane is of the formula:

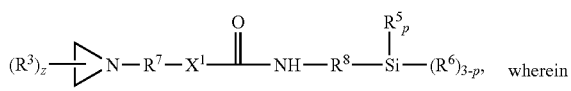 wherein $R^3$ is a $C_1$-$C_4$ alkyl group,
z is 1, 2 or 3;
$R^7$ and $R^8$ are each independently divalent alkylene, optionally substituted by one or more catenary nitrogen or oxygen atoms;
$X^1$ is —$NR^3$— or —O—,
$R^5$ is a hydrolysable group,
$R^6$ is a monovalent alkyl or aryl group, and
p is 1, 2 or 3.

9. The pressure-sensitive adhesive of claim 1 wherein said aziridinyl silane is of the formulas:

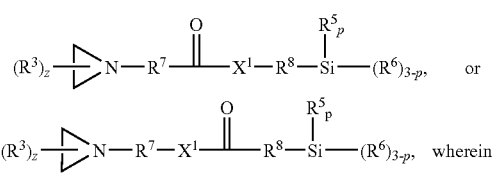

$R^3$ is a $C_1$-$C_4$ alkyl group,
z is 0, 1 or 2;
$R^7$ and $R^8$ are each independently divalent alkylene, optionally substituted by one or more catenary nitrogen or oxygen atoms;
$X^1$ is —$NR^3$— or —O—,
$R^5$ is a hydrolysable group,
$R^6$ is a monovalent alkyl or aryl group, and
p is 1, 2 or 3.

10. The pressure-sensitive adhesive of claim 1 wherein the molar ratio of the aziridine groups of the aziridinyl silane to the acid functional groups of said polymer is in the range of 1:1500 to 1:300.

11. The pressure-sensitive adhesive of claim 1 wherein said second polar monomer is selected from 2-hydroxyethyl (meth)acrylate; N-vinylpyrrolidone; N-vinylcaprolactam; acrylamide; t-butyl acrylamide; dimethylamino ethyl acrylamide; N-octyl acrylamide; poly(alkoxyalkyl)acrylates including 2-(2-ethoxyethoxy)ethyl acrylate, 2-ethoxyethyl acrylate, 2-methoxyethoxyethyl acrylate, 2-methoxyethyl methacrylate, polyethylene glycol mono(meth)acrylates; poly(vinyl methyl ether); and mixtures thereof.

12. The pressure-sensitive adhesive of claim 1 wherein said polymer comprises 1 to 5 parts by weight of acrylic acid and 1 to 5 parts by weight of a second polar monomer.

13. The pressure-sensitive adhesive of claim 1 wherein said adhesive is an aqueous emulsion.

14. The pressure-sensitive adhesive of claim 13 wherein said aqueous emulsion has a pH of greater than 7.

15. The pressure-sensitive adhesive of claim 1 wherein the acid functional monomer is selected from acrylic acid, methacrylic acid, itaconic acid, fumaric acid, crotonic acid, citraconic acid, maleic acid, oleic acid, β-carboxyethyl acrylate, 2-sulfoethyl methacrylate, styrene sulfonic acid, 2-acrylamido-2-methylpropane sulfonic acid, vinyl phosphonic acid, and mixtures thereof.

16. The pressure-sensitive adhesive of claim 1 comprising 1 to 5 parts of a vinyl monomer selected from vinyl esters, styrene, substituted styrene, vinyl halide, vinyl propionate, and mixtures thereof.

17. The composition of claim 1, wherein said polymer component comprises a mixture of polymers.

18. The composition of claim 1 with the average number of carbon atoms of the non-tertiary alcohol being from about 4 to about 12.

19. The composition of claim 1 comprising a mixture of spherical and acicular silica nanoparticles.

20. The composition of claim 1 further comprising from 0.01 to 1 parts by weight of a multifunctional (met)acrylate crosslinking agent, based on 100 parts by weight total monomers.

21. An adhesive article comprising the pressure-sensitive adhesive of claim 1 and a flexible backing layer.

22. The adhesive coated sheet article of claim 21 wherein the flexible backing layer is selected from paper, latex saturated paper, polymeric film, polylactide, cellulose acetate film, ethyl cellulose film, woven or nonwoven cloth, metallic foil, and ceramic sheeting.

23. An emulsion comprising:
   (a) 30 to about 70 weight percent, based on the total weight of the emulsion, of the adhesive of claim 1, and
   (b) 30 to 70 weight percent of an aqueous phase comprising a surfactant, based on the total weight of the emulsion.

24. The emulsion of claim 23 wherein said composition has a pH of greater than 7.

25. An adhesive-silica nanoparticle composite of the formula:

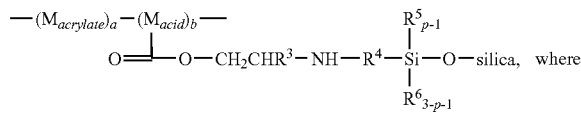

$M_{acrylate}$ represents polymerized monomer units derived from (meth)acrylate monomers, $M_{acid}$ represents polymerized monomer units derived from acid functional monomers, a and b are integers of at least one, such that a+b is polymeric, $R^3$ is H or a $C_1$-$C_4$ alkyl group, $R^4$ is a divalent alkylene, optionally substituted by one or more catenary oxygen atoms, ester groups, urea groups or urethane groups, $R^5$ is a hydrolysable group, $R^6$ is a monovalent alkyl or aryl group, p is 1, 2 or 3, and silica represents a silica particle.

* * * * *

UNITED STATES PATENT AND TRADEMARK OFFICE
CERTIFICATE OF CORRECTION

PATENT NO. : 7,652,095 B2
APPLICATION NO. : 11/765963
DATED : January 26, 2010
INVENTOR(S) : Timothy D. Filiatrault It is certified that error appears in the above-identified patent and that said Letters Patent is hereby corrected as shown below:

Column 1,
Lines 66-67, delete "As used herein:" and insert the same on Col. 1, Line 67 as a new line.

Column 2,
Line 3, delete "copolymer." and insert -- copolymer; --.

Column 4,
Line 12, delete "N-vinylpyrrolidinone." and insert -- N-vinylpyrrolidone. --.
Lines 28-29, delete "tr(meth)iacrylate," and insert -- tri(meth)acrylate, --.

Line 55, delete " 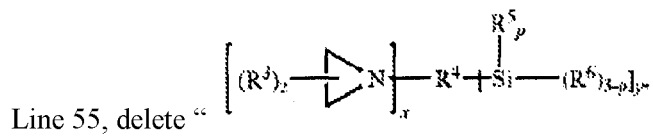 " and insert -- 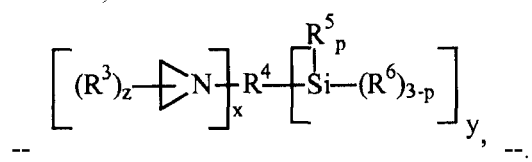 , --.

Column 5,
Line 3, delete "1" and insert -- 1; --.

Line 40, delete " 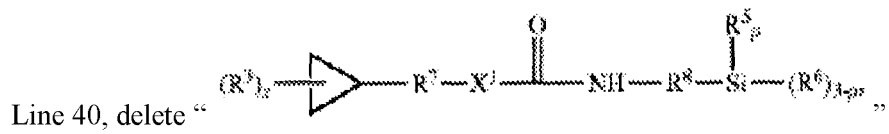 " and insert -- 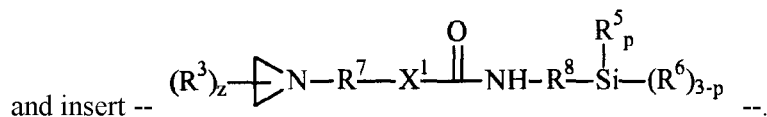 --.

Column 7,
Line 33, delete "SiO$_2$ /M$_2$O" and insert -- SiO$_2$/M$_2$O --.

Column 13,
Line 7, delete "cumarone" and insert -- coumarone --.

Column 14,
Line 24, delete "polypropylene)," and insert -- poly(propylene), --.

Column 20,
Line 25, in claim 1, delete "weight," and insert -- weight --.

Column 21,
Line 17, in claim 7, delete "1" and insert -- 1; --.

Column 22,
Line 30, in claim 20, delete "(met)acrylate" and insert -- (meth)acrylate --.
Line 52, in claim 25, delete "where" and insert -- wherein --.
Line 60, in claim 25, delete "R³is" and insert -- R³ is --.

Signed and Sealed this

Twenty-third Day of March, 2010

David J. Kappos
*Director of the United States Patent and Trademark Office*